United States Patent
Chen

(10) Patent No.: US 10,042,175 B2
(45) Date of Patent: Aug. 7, 2018

(54) THREE DIMENSIONAL DISPLAY APPARATUS

(71) Applicant: SHENZHEN CHINA STAR OPTOELECTRONICS TECHNOLOGY CO., LTD., Shenzhen, Guangdong (CN)

(72) Inventor: Jianhong Chen, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 361 days.

(21) Appl. No.: 14/890,851

(22) PCT Filed: Sep. 14, 2015

(86) PCT No.: PCT/CN2015/089528
§ 371 (c)(1),
(2) Date: Nov. 12, 2015

(87) PCT Pub. No.: WO2017/041311
PCT Pub. Date: Mar. 16, 2017

(65) Prior Publication Data
US 2017/0184867 A1    Jun. 29, 2017

(30) Foreign Application Priority Data
Sep. 10, 2015  (CN) .......................... 2015 1 0572448

(51) Int. Cl.
*G02B 27/22*    (2018.01)
*G02B 3/00*    (2006.01)

(52) U.S. Cl.
CPC ......... *G02B 27/225* (2013.01); *G02B 3/0056* (2013.01)

(58) Field of Classification Search
CPC ... G02B 27/22; G02B 27/225; G02B 27/0056
See application file for complete search history.

(56) References Cited

U.S. PATENT DOCUMENTS

| | | |
|---|---|---|
| 2006/0001974 A1 | 1/2006 | Uehara et al. |
| 2009/0322862 A1* | 12/2009 | Marie Vissenberg ........ G02B 27/2214 348/59 |
| 2010/0214537 A1* | 8/2010 | Thomas ............... G02B 27/225 353/7 |

(Continued)

FOREIGN PATENT DOCUMENTS

| | | |
|---|---|---|
| CN | 1271106 A | 10/2000 |
| CN | 201945751 U | 8/2011 |
| CN | 103809293 A | 5/2014 |

*Primary Examiner* — Elmito Breval
(74) *Attorney, Agent, or Firm* — Ladas & Parry LLP

(57) ABSTRACT

A three dimension apparatus is provided and includes a backlight source, a display panel and a fly-eye lens array. The backlight source is used for providing an emitted light, the display panel is used for displaying an image based on data signals, scan signals, and the emitted light from the backlight source. The backlight source includes a plurality of sub-pixel units. The fly-eye lens array includes a plurality of lens units for performing a convergence operation on the emitted light for the backlight source to achieve a three dimensional displaying for naked eyes. The shape of each of the lens units is a square.

10 Claims, 2 Drawing Sheets

(56) References Cited

U.S. PATENT DOCUMENTS

| | | | | |
|---|---|---|---|---|
| 2011/0170184 A1* | 7/2011 | Wolk | ............... | G02B 27/2214 |
| | | | | 359/463 |
| 2011/0249093 A1* | 10/2011 | Yeh | ............... | G02B 5/201 |
| | | | | 348/46 |
| 2012/0154463 A1* | 6/2012 | Hur | ............... | G02B 27/2214 |
| | | | | 345/691 |
| 2016/0014398 A1* | 1/2016 | Kroon | ............... | G02B 27/225 |
| | | | | 348/59 |
| 2016/0150220 A1* | 5/2016 | Jung | ............... | H04N 13/0404 |
| | | | | 348/59 |

\* cited by examiner

THREE DIMENSIONAL DISPLAY APPARATUS

FIELD OF THE INVENTION

The present invention relates to the technical field of displays, and in particular to a three dimensional display apparatus.

BACKGROUND OF THE INVENTION

With the development of society, people demand higher and higher display quality from display panels. Particularly, with the development of the three dimensional display apparatus, users desire a three dimensional display apparatus with a convenient operation and low production cost.

As shown in FIG. 1, which is a schematic structural diagram of a conventional three dimensional display apparatus. The three dimensional display apparatus 10 includes a display unit 11 and a fly-eye lens array 12. The display unit 11 includes a plurality of sub-pixel units 111. The fly-eye lens array 12 includes a plurality of lens units 121. Each of the lens units 121 corresponds to at least one of the sub-pixel units 111. The images of the display unit 11 are orthogonally projected or perspectively projected into space through a fly-eye lens array 12 for forming three dimensional images. The human eyes in a specific viewing area can see different images, thereby forming three dimensional images.

However, when the above three dimensional display apparatus displays three dimensional images, the moirépattern phenomenon easily occurs, thus affecting the display quality of the three dimensional display apparatus.

Therefore, it is necessary to provide a three dimensional display apparatus for solving the problem of the prior art.

SUMMARY OF THE INVENTION

An object of the present invention is to provide a three dimensional display apparatus in which the moirépattern phenomenon does not occur, to improve display quality, so as to solve the technical problem that the moirépattern phenomenon tends to occur in the conventional three dimensional display apparatus, thus affecting the display quality.

To solve the problem, the technical solutions of the present invention are as follows A three dimensional display apparatus is provided in the present invention, comprising:

a backlight source for providing emitted light;

a display panel for displaying an image based upon data signals, scan signals and the emitted light from the backlight source, the display panel including a plurality of sub-pixel units; and a fly-eye lens array including a plurality of lens units for performing a convergence operation on the emitted light for the display panel to achieve a three dimensional displaying for naked eyes;

wherein a shape of each of the lens units is a square, the lens units are arranged in a square, the display panel includes a plurality of image units formed by at least one of the sub-pixel units, and each of the image units corresponds to one of the lens units.

In the three dimensional display apparatus of the present invention, a pitch P of the lens units is longer than 1 mm and shorter than 1.5 mm.

In the three dimensional display apparatus of the present invention, a focal length f of the lens unit is longer than 2.2 mm and shorter than 3.5 mm.

In the three dimensional display apparatus of the present invention, an angle θ between an edge of the lens units and a shorter side of the display panel is wider than 3 degrees and narrower than 7 degrees.

In the three dimensional display apparatus of the present invention, an angle θ between an edge of the lens units and a shorter side of the display panel is wider than 12 degrees and narrower than 22 degrees.

In the three dimensional display apparatus of the present invention, an angle θ between an edge of the lens units and a shorter side of the display panel is wider than 26 degrees and narrower than 29 degrees.

In the three dimensional display apparatus of the present invention, an angle θ between an edge of the lens units and a shorter side of the display panel is wider than 33 degrees and narrower than 40 degrees.

In the three dimensional display apparatus of the present invention, a difference g-f between a distance g from a vertex of the lens units to the display panel and the focal length f of the lens unit is greater than 0.3 mm and less than 0.7 mm.

A three dimensional display apparatus is also provided in the present invention, comprising:

a backlight source for providing emitted light;

a display panel for displaying an image based upon data signals, scan signals and the emitted light from the backlight source, the display panel including a plurality of sub-pixel units; and a fly-eye lens array including a plurality of lens units for performing a convergence operation on the emitted light for the display panel to achieve a three dimensional displaying for naked eyes;

wherein a shape of each of the lens units is a square.

In the three dimensional display apparatus of the present invention, a pitch P of the lens units is longer than 1 mm and shorter than 1.5 mm.

In the three dimensional display apparatus of the present invention, a focal length f of the lens unit is longer than 2.2 mm and shorter than 3.5 mm.

In the three dimensional display apparatus of the present invention, an angle θ between an edge of the lens units and a shorter side of the display panel is wider than 3 degrees and narrower than 7 degrees.

In the three dimensional display apparatus of the present invention, an angle θ between an edge of the lens units and a shorter side of the display panel is wider than 12 degrees and narrower than 22 degrees.

In the three dimensional display apparatus of the present invention, an angle θ between an edge of the lens units and a shorter side of the display panel is wider than 26 degrees and narrower than 29 degrees.

In the three dimensional display apparatus of the present invention, an angle θ between an edge of the lens units and a shorter side of the display panel is wider than 33 degrees and narrower than 40 degrees.

In the three dimensional display apparatus of the present invention, a difference g-f between a distance g from a vertex of the lens units to the display panel and the focal length f of the lens unit is greater than 0.3 mm and less than 0.7 mm.

In the three dimensional display apparatus of the present invention, the lens units are arranged in a square.

In the three dimensional display apparatus of the present invention, the display panel includes a plurality of image units formed by at least one of the sub-pixel units, and each of the image units corresponds to one of the lens units.

Compared with the conventional three dimensional display apparatus, by disposing the fly-eye lens array formed by the square lens units to achieve the naked eye three dimensional display, the three dimensional display apparatus of the present invention makes the moirépattern phenomenon not occur, thereby improving the display quality. Hence, the technical problem, in which the moirépattern phenomenon tends to occur in the conventional three dimensional display apparatus, thus affecting the display quality, is resolved.

To make the above content of the present invention more clearly comprehensible, the preferred embodiments below with the accompanying drawings are described in detail as follows:

DETAILED DESCRIPTION OF THE PREFERRED EMBODIMENTS

Figure 1:
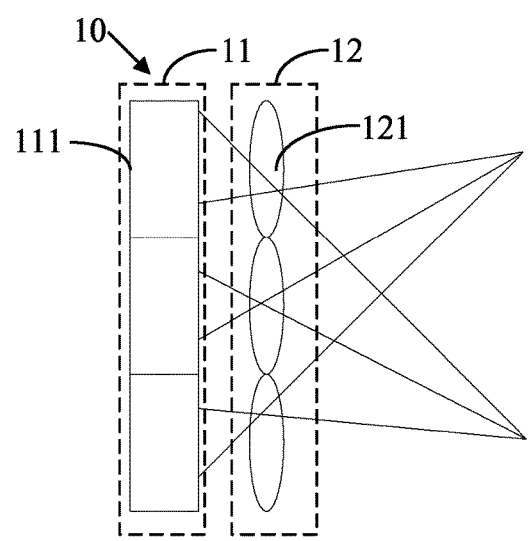
FIG. 1 is a schematic structural diagram of a convention three dimensional display apparatus.

The following description of the embodiments with reference to the accompanying drawings is used to illustrate particular embodiments of the present invention. The directional terms referred in the present invention, such as "upper", "lower", "front", "after", "left", "right", "inner", "outer", "side surface", etc. are only directions with regard to the accompanying drawings. Therefore, the directional terms used for describing and illustrating the present invention are not intended to limit the present invention.

In the drawings, units with similar structures are indicated by the same reference number.

Figure 2:
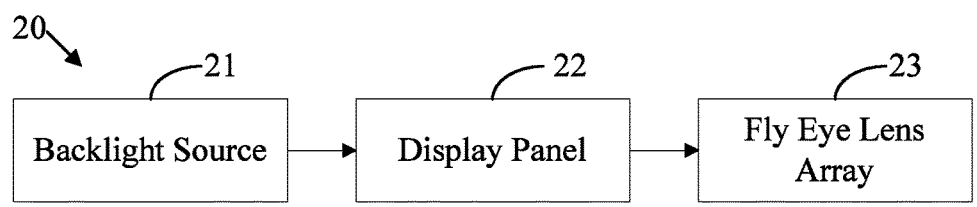
FIG. 2 is a structural diagram of a three dimensional display apparatus in accordance with a preferred embodiment of the present invention.
Figure 3:
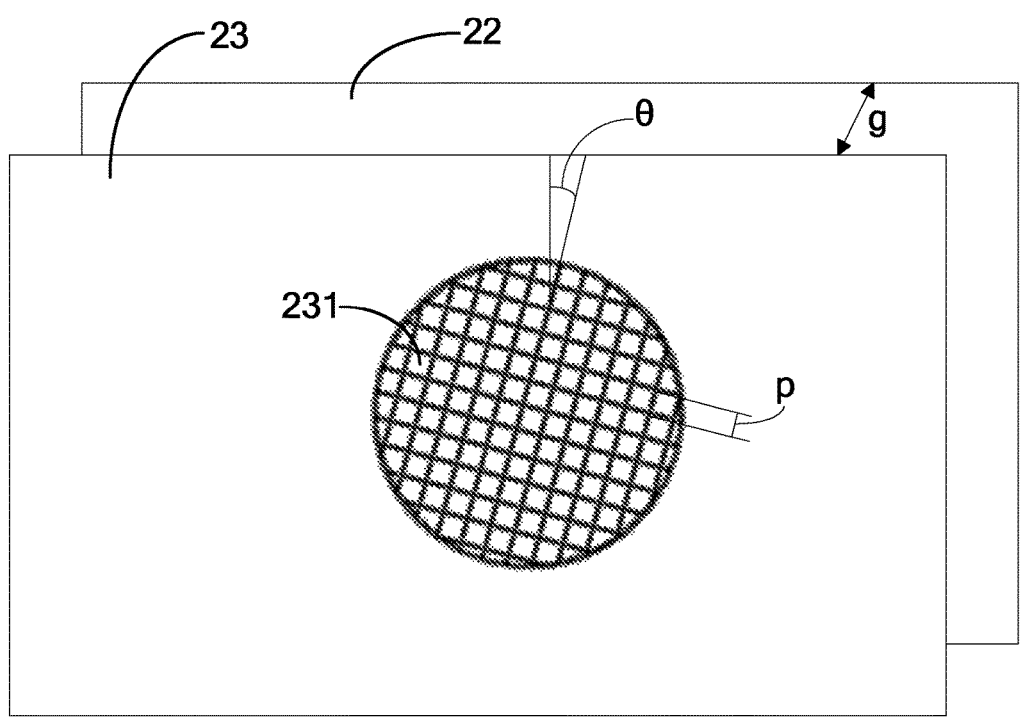
FIG. 3 is a specific structural diagram of a display panel and a fly-eye lens array of a three dimensional display apparatus in accordance with a preferred embodiment of the present invention.

Please refer to FIG. 2 and FIG. 3. FIG. 2 is a structural diagram of a three dimensional display apparatus in accordance with a preferred embodiment of the present invention. FIG. 3 is a specific structural diagram of a display panel and a fly-eye lens array of a three dimensional display apparatus in accordance with a preferred embodiment of the present invention. The three dimensional display apparatus 20 of the preferred embodiment includes a backlight source 21, a display panel 22 and a fly-eye lens array 23. The backlight source 21 provides emitted light. The display panel 22 displays an image based upon data signals, scan signals and the emitted light from the backlight source 21, and includes a plurality of sub-pixel units. The fly-eye lens array includes a plurality of lens units 231 for performing a convergence operation on the emitted light for the display panel 22 to achieve a three dimensional displaying for naked eyes. The shape of each of the lens units is a square, and the lens units are arranged in a square, as shown in FIG. 3.

The display panel includes a plurality of image units formed by at least one of the sub-pixel units (not shown in the figures), and each of the image units corresponds to one of the lens units.

In the preferred embodiment, a pitch P of the lens units 231 of the three dimensional display apparatus 20, which is the edge length of the square lens units 231, is longer than 1 mm and shorter than 1.5 mm. If the pitch P is set to be shorter, the viewing angle of the entire three dimensional display apparatus 20 is affected, making the viewing angle of the three dimensional display apparatus 20 narrower. The pitch P is set to be longer, the image units of the three dimensional display apparatus 20 are larger, and the three dimensional display apparatus 20 has the lower resolution. The pitch P is set to be longer than 1 mm and shorter than 1.5 mm for meeting the viewing angle demand of the users as well as achieving the appropriate resolution of the three dimensional display apparatus.

In the preferred embodiment, a focal length f of the lens unit 231 of the three dimensional display apparatus 20 is longer than 2.2 mm and shorter than 3.5 mm. If the focal length f is set to be longer, the viewing angle of the entire three dimensional display apparatus 20 is affected, making the viewing angle of the three dimensional display apparatus 20 narrower. if the focal length f is set to be shorter than 2.2 mm, the production cost of the lens unit 231 increases drastically. Therefore, the focal length f is longer than 2.2 mm and shorter than 3.5 mm for meeting the viewing angle demand of the users as well as effectively controlling the production cost of the three dimensional display apparatus 20.

In the preferred embodiment, an angle $\theta$ between an edge of the lens units and a shorter side of the display panel is wider than 3 degrees and narrower than 7 degrees, wider than 12 degrees and narrower than 22 degrees, wider than 26 degrees and narrower than 29 degrees, or wider than 33 degrees and narrower than 40 degrees. In order to effectively eliminate the moirépattern phenomenon, the inventors tested the three dimensional display apparatuses 20 with different angles $\theta$ between the edge of the lens units and the shorter side of the display panel, and found that when the angle $\theta$ is wider than 3 degrees and narrower than 7 degrees, wider than 12 degrees and narrower than 22 degrees, wider than 26 degrees and narrower than 29 degrees, or wider than 33 degrees and narrower than 40 degrees, the moirépattern phenomenon does not occur to the three dimensional images display on the three dimensional display panel, that is, when the angle $\theta$ is set to be within the aforementioned angle ranges, the three dimensional display apparatus 20 achieves the optimum display quality of the three dimensional images.

In the preferred embodiment, the difference g-f between the distance g from an vertex of the lens units to the display panel and the focal length f of the lens unit is greater than 0.3 mm and less than 0.7 mm. If g-f is set to be smaller, the moirépattern phenomenon on the three dimensional display apparatus 20 will become more serious again. If g-f is set to be greater, the crosstalk will become more serious when the three dimensional image is displayed on the three dimensional display apparatus 20. Therefore, when g-f is set to be greater than 0.3 mm and less than 0.7 mm, the optimum quality of the three dimensional images displayed on the three dimensional display panel 20 is ensured.

When the three dimensional display apparatus 20 of the preferred embodiment is in use, the backlight source 21 provides the emitted light. The display panel 22 displays images through the plurality of the sub-pixel units based upon the data signals, the scan signals, and the emitted light from the backlight source 21. Afterward, the emitted light which has the display image of the sub-pixel units undergoes convergence through the lens units 31 of the fly-eye lens array 23 to achieve the naked eye three dimensional display. The pitch P of the lens units 231 of the fly-eye lens array 23 P, the focal length f of the lens unit 231, the angle $\theta$ between the edge of the lens units 231 and the shorter side of the display panel 22, and the difference g-f between the distance g from a vertex of the lens units 231 to the display panel 22 and the focal length f of the lens unit 231 are set to meet the aforementioned requirements. Therefore, when the three dimensional display apparatus 20 of the preferred embodiment is displaying the three dimensional images, the moirépattern phenomenon, the crosstalk, and the narrow viewing angle do not occur, while the three dimensional display apparatus 20 of the preferred embodiment has low production cost.

By disposing the fly-eye lens array formed by the square lens units to achieve the naked eye three dimensional display, the three dimensional display apparatus of the present invention makes the moirépattern phenomenon not occur, thereby improving the display quality. The technical problem, in which the moirépattern phenomenon tends to occur in the conventional three dimensional display apparatus, thus affecting the display quality, is resolved.

In summary, although the preferred embodiment of the present invention has been disclosed above, the foregoing preferred embodiment of the present invention is not intended to limit the present invention. A person of ordinary skill in the art, without departing from the spirit and the scope of the invention, may make various modifications and variations. Therefore, the scope of the present invention is defined in the claims.

What is claimed is:

1. A three dimensional display apparatus, comprising:
    a backlight source for providing emitted light;
    a display panel for displaying an image based upon data signals, scan signals, and the emitted light from the backlight source, the display panel including a plurality of sub-pixel units; and
    a fly-eye lens array including a plurality of lens units for performing a convergence operation on the emitted light for the display panel to achieve a three dimensional displaying for naked eyes;
    wherein a shape of each of the lens units is a square, the lens units are arranged in a square, the display panel includes a plurality of image units formed by at least one of the sub-pixel units, and each of the image units corresponds to one of the lens units;
    wherein an angle θ between an edge of the lens units and a shorter side of the display panel is wider than 3 degrees and narrower than 7 degrees, wider than 12 degrees and narrower than 22 degrees, wider than 26 degrees and narrower than 29 degrees, or wider than 33 degrees and narrower than 40 degrees.

2. The three dimensional display apparatus as claimed in claim 1, wherein a pitch P of the lens units is longer than 1 mm and shorter than 1.5 mm.

3. The three dimensional display apparatus as claimed in claim 1, wherein a focal length f of the lens unit is longer than 2.2 mm and shorter than 3.5 mm.

4. The three dimensional display apparatus as claimed in claim 1, wherein a difference g-f between a distance g from a vertex of the lens units to the display panel and the focal length f of the lens unit is greater than 0.3 mm and less than 0.7 mm.

5. A three dimensional display apparatus, comprising:
    a backlight source for providing emitted light;
    a display panel for displaying an image based upon data signals, scan signals and the light emitted from the backlight source, the display panel including a plurality of sub-pixel units; and
    a fly-eye lens array including a plurality of lens units for performing a convergence operation on the emitted light for the display panel to achieve a three dimensional displaying for naked eyes;
    wherein a shape of each of the lens units is a square, and the lens units are arranged in a square;
    wherein an angle θ between an edge of the lens units and a shorter side of the display panel is wider than 3 degrees and narrower than 7 degrees, wider than 12 degrees and narrower than 22 degrees, wider than 26 degrees and narrower than 29 degrees, or wider than 33 degrees and narrower than 40 degrees.

6. The three dimensional display apparatus as claimed in claim 5, wherein a pitch P of the lens units is longer than 1 mm and shorter than 1.5 mm.

7. The three dimensional display apparatus as claimed in claim 5, wherein a focal length f of the lens unit is longer than 2.2 mm and shorter than 3.5 mm.

8. The three dimensional display apparatus as claimed in claim 5, wherein a difference g-f between a distance g from a vertex of the lens units to the display panel, and the focal length f of the lens unit is greater than 0.3 mm and less than 0.7 mm.

9. The three dimensional display apparatus as claimed in claim 5, wherein the lens units are arranged in a square.

10. The three dimensional display apparatus as claimed in claim 5, wherein the display panel includes a plurality of image units formed by at least one of the sub-pixel units, and each of the image units corresponds to one of the lens units.

* * * * *